United States Patent
Norimatsu

(10) Patent No.: US 6,922,142 B2
(45) Date of Patent: Jul. 26, 2005

(54) TIRE AIR PRESSURE MONITORING SYSTEM

(75) Inventor: Hideaki Norimatsu, Toyohashi (JP)

(73) Assignee: Denso Corporation, Kariya (JP)

(*) Notice: Subject to any disclaimer, the term of this patent is extended or adjusted under 35 U.S.C. 154(b) by 82 days.

(21) Appl. No.: 10/643,920

(22) Filed: Aug. 20, 2003

(65) Prior Publication Data

US 2004/0046651 A1 Mar. 11, 2004

(30) Foreign Application Priority Data

Sep. 9, 2002 (JP) ........................................ 2002-263024

(51) Int. Cl.$^7$ .............................................. B60C 23/00
(52) U.S. Cl. ..................... 340/447; 73/146.5; 340/442; 340/445; 455/343.2; 455/343.4
(58) Field of Search ............................ 340/10.33, 447, 340/442, 445, 449; 701/29, 30; 73/146.4, 146.5; 455/574, 343.1, 343.2, 343.3, 343.4

(56) References Cited

U.S. PATENT DOCUMENTS

| | | | | |
|---|---|---|---|---|
| 5,765,104 | A | | 6/1998 | Kushita .................... 370/311 |
| 6,239,690 | B1 | * | 5/2001 | Burbidge et al. ........ 340/10.33 |
| 6,259,360 | B1 | * | 7/2001 | Takamura .................... 340/445 |
| 6,430,484 | B1 | | 8/2002 | Takamura et al. ........... 340/447 |
| 6,744,357 | B2 | * | 6/2004 | Itou et al. .................... 340/445 |
| 2003/0179082 | A1 | * | 9/2003 | Ide ........................... 340/425.5 |
| 2003/0179085 | A1 | * | 9/2003 | Ghabra et al. .............. 340/445 |
| 2004/0222882 | A1 | * | 11/2004 | Miyazaki .................... 340/445 |

FOREIGN PATENT DOCUMENTS

| | | |
|---|---|---|
| JP | 10-22896 | 1/1998 |
| JP | 2000-142043 | 5/2000 |
| JP | 2001-105811 | 4/2001 |

* cited by examiner

Primary Examiner—Brent A. Swarthout
(74) Attorney, Agent, or Firm—Posz Law Group, PLC

(57) ABSTRACT

Provided is a tire air pressure monitoring system capable of sufficiently lowering the electric power dissipation in a monitoring unit. The monitoring unit acquires, on the basis of information on transmission intervals included in transmitted signals from sensor units, the next transmission timings of signals to be transmitted from the sensor units and is switched from a sleep mode to a waking-up mode to receive the transmitted signals from the sensor unit in synchronism with the next transmission timings. This can efficiently set the monitoring unit in a waking-up condition, i.e., a signal receivable condition, thereby preventing useless electric power dissipation and reducing the electric power consumption.

8 Claims, 5 Drawing Sheets

FIG. 6

| ID | RECEPTION TIME INTERVAL | | | | |
|---|---|---|---|---|---|
| ***1 | Ta1 | Tb1 | Tc1 | ---------------- | Tn1 |
| ***2 | Ta2 | Tb2 | Tc2 | ---------------- | Tn2 |
| ***3 | Ta3 | Tb3 | Tc3 | ---------------- | Tn3 |
| ***4 | Ta4 | Tb4 | Tc4 | ---------------- | Tn4 |

FIG. 7

| ID | RECEPTION TIME INTERVAL | | | | | | | | | |
|---|---|---|---|---|---|---|---|---|---|---|
| ***0 | 20 MIN | 10 MIN | | | | | | | | |
| ***9 | 19 MIN | 18 MIN | 17 MIN | 16 MIN | 15 MIN | 14 MIN | 13 MIN | 12 MIN | 11 MIN | 20 MIN |
| ***8 | 18 MIN | 16 MIN | 14 MIN | 12 MIN | 20 MIN | | | | | |
| ***7 | 17 MIN | 14 MIN | 11 MIN | 18 MIN | 15 MIN | 12 MIN | 19 MIN | 16 MIN | 13 MIN | 20 MIN |
| ***6 | 16 MIN | 12 MIN | 18 MIN | 14 MIN | 20 MIN | | | | | |
| ***5 | 15 MIN | 20 MIN | 10 MIN | | | | | | | |
| ***4 | 14 MIN | 18 MIN | 12 MIN | 16 MIN | 20 MIN | | | | | |
| ***3 | 13 MIN | 16 MIN | 19 MIN | 12 MIN | 15 MIN | 18 MIN | 11 MIN | 14 MIN | 17 MIN | 20 MIN |
| ***2 | 12 MIN | 14 MIN | 16 MIN | 18 MIN | 20 MIN | | | | | |
| ***1 | 11 MIN | 12 MIN | 13 MIN | 14 MIN | 15 MIN | 16 MIN | 17 MIN | 18 MIN | 19 MIN | 20 MIN |

TIRE AIR PRESSURE MONITORING SYSTEM

BACKGROUND OF THE INVENTION

1) Field of the Invention

The present invention relates to a tire air pressure monitoring system for monitoring an air pressure of each of tires of a vehicle, and more particularly to the reduction of electric power dissipation (consumption) in the tire air pressure monitoring system.

2) Description of the Related Art

So far, there have been proposed various types of systems designed to monitor an air pressure of each of tires mounted on a vehicle. One approach is a tire air pressure monitoring system in which a sensor unit composed of a sensor for detecting a tire air pressure and a transmitter for transmitting the detection value thereof is attached onto each of tires of a vehicle while a monitoring unit is mounted in the vehicle body side so that the sensor unit transmits a detection signal indicative of an air pressure detection value on each tire unit and the monitoring unit issues a warning in a case in which the air pressure detection value from the sensor unit falls below a predetermined value.

For example, Japanese Patent Laid-Open No. 2001-105811 (corresponding to U.S. Pat. No. 6,430,484) discloses a tire air pressure monitoring system in which a monitoring unit mounted in a vehicle body side is placed into a waking-up mode in order to lower the electric power dissipation at the tire air pressure detection when a vehicle engine falls into a stop condition. This waking-up mode signifies that the monitoring unit is alternately set in a receivable condition and an unreceivable condition with respect to a signal transmitted from a sensor unit. In a case in which the monitoring unit is in the unreceivable condition, the system stops the power supply to principal equipment, such as a receiver, constituting the monitoring unit, thereby achieving the reduction of the electric power dissipation in the monitoring unit.

However, the foregoing conventional tire air pressure monitoring system is designed such that the monitoring unit is set in the transmitted signal receivable condition at a constant interval and, if a transmitted signal from the sensor unit is received in the receivable condition, the transmitted signal is picked up, while if the transmitted signal from the sensor unit is absent in the receivable condition which continues for a constant period of time, the receivable condition is switched into the unreceivable condition (sleep mode). That is, in the foregoing conventional tire air pressure monitoring system, the monitoring unit is made to be set in the receivable condition at a constant interval irrespective of the presence or absence of the transmitted signal. This leads to the useless consumption of electric power and is remote from a sufficient reduction of electric power dissipation.

SUMMARY OF THE INVENTION

The present invention has developed in consideration of this situation, and it is therefore an object of the invention to provide a tire air pressure monitoring system capable of satisfactorily lowering the electric power dissipation in the monitoring unit.

For this purpose, in accordance with a first aspect of the present invention, there is provided a tire air pressure monitoring system comprising a sensor unit mounted on a tire of a vehicle for measuring an air pressure of the tire and for transmitting a signal including the air pressure measurement value intermittently, and a monitoring unit mounted on a vehicle body for receiving the transmitted signal from the sensor unit to monitor an air pressure state of the tire on the basis of the air pressure measurement value included in the transmitted signal, wherein the monitoring unit includes timing acquiring means for acquiring a transmission timing at which the signal is transmitted from the sensor unit and mode switching means for, in synchronism with the signal transmission timing acquired by the timing acquiring means, setting the monitoring unit in a monitoring processing mode to receive the transmitted signal and monitor the tire air pressure state and for setting the monitoring unit in a sleep mode to rest its monitoring processing function for a period of time from when the monitoring processing in the monitoring processing mode reaches completion until the next signal transmission timing.

Thus, in this tire air pressure monitoring system, the timing acquiring means of the monitoring unit acquires a transmission timing at which the sensor unit transmits a signal and, in synchronism with the transmission timing, the monitoring processing mode is set for the reception of a transmitted signal and others. Accordingly, unlike the conventional tire air pressure monitoring system, this tire air pressure monitoring system can avoid the situation of no reception of a transmitted signal from the sensor unit while the monitoring unit is in a signal receivable condition, which, in the monitoring unit, preventing the electric power from being uselessly dissipated and, in consequence, lowering the power dissipation.

Furthermore, according to a second aspect of the present invention, in the foregoing tire air pressure monitoring system, the sensor unit is made to transmit a signal including, in addition to the air pressure measurement value, information on the next signal transmission timing, and the timing acquiring means acquires the timing of the transmission of a signal from the sensor unit on the basis of the information on the next signal transmission timing.

In this tire air pressure monitoring system, the timing acquiring means of the monitoring unit can acquire the next signal transmission timing on the basis of the next signal transmission timing information included in the transmitted signal from the sensor unit. Accordingly, the mode switching means of the monitoring unit can accurately be synchronized with the next signal transmission timing to set the monitoring unit in the monitoring processing mode.

Still furthermore, according to a third aspect of the present invention, in the foregoing tire air pressure monitoring system, preferably, the sensor unit is mounted on each of tires of the vehicle and each of the sensor units is made to determine the next signal transmission timing to make a different signal transmission interval at random (the signal transmission interval of each of the sensor units varies at random). This can prevent radio interference from occurring because the plurality of sensor units mounted on the tires of the vehicle transmit signals at the same timing.

Yet furthermore, according to a fourth aspect of the present invention, preferably, the different signal transmission intervals of each of the sensor units are set at random to make a repeated pattern comprising a plurality of transmission intervals which have different time lengths, and the timing acquiring means includes storage means for storing the plurality of transmission intervals constituting the transmission interval pattern for each of the sensor units. If the transmission interval pattern is stored in the timing acquiring means, even in a case in which, for example, due to a noise from the external, difficulty is encountered in receiving a transmitted signal from the sensor unit, the next signal transmission timing is obtainable from the stored transmission interval pattern and the subsequent signal reception is achievable without intermission.

In addition, according to a fifth aspect of the present invention, preferably, the plurality of transmission intervals to be stored in the storage means are the reception intervals at which the monitoring unit receives the transmitted signals from the sensor units. Each of the sensor unit and monitoring unit measures a time length until the next signal transmission timing through the use of its own built-in time measuring means such as a timer. At this time, if a time difference exists between the time measuring means thereof, even if the monitoring unit accurately measures the time length until the next signal transmission timing, there is a possibility that difficulty is experienced in receiving a transmitted signal. For this reason, the actual signal reception intervals are stored as the transmission intervals constituting the transmission interval pattern. In this case, even if a time difference exists between the time measuring means, the monitoring unit can be set in the monitoring processing mode at a timing which secures the transmitted signal reception.

Still additionally, according to a sixth aspect of the present invention, in the foregoing tire air pressure monitoring system, the sensor unit is mounted on each of the tires of the vehicle, and the intervals at which the sensor units transmit signals are set to differ from each other among the sensor units, and the timing acquiring means stores the intervals of the transmission of the signal from each of the sensor units to acquire the timing of the signal transmission from each of the sensor units on the basis of the stored transmission intervals. Since different signal transmission intervals are set in advance for each sensor unit and are stored in the timing acquiring means, the monitoring unit can be set in the monitoring processing mode in synchronism with the transmission timing of the signal from each of the sensor units.

In this case, as in the case of the fourth aspect of the present invention, even in a case in which, for example, due to a noise from the external, difficulty is encountered in receiving a transmitted signal from the sensor unit, the timing acquiring means can acquire the next signal transmission timing of the sensor unit from the stored transmission intervals, and the subsequent signal reception is achievable without intermission.

Moreover, according to a seventh aspect of the present invention, preferably, the transmission intervals of each of the sensor units are set to have different time lengths at random to make a repeated pattern comprising a plurality of transmission intervals. This can prevent the interference among the transmitted signals from the sensor units.

Still moreover, according to an eighth aspect of the present invention, preferably, the mode switching means sets the monitoring unit in the sleep mode only when an ignition switch of the vehicle is in an off condition. In other words, in a case in which the ignition switch of the vehicle is turned on to drive the vehicle engine, the vehicle battery is in a charged condition and, hence, no problem occurs even if the dissipated current increases to some degree. Therefore, it is preferable that the monitoring unit is set in the monitoring processing mode at all times. Accordingly, even if a difference occurs between the transmission timing of the sensor unit and the reception timing of the monitoring unit so that the signal unreceivable condition continues, the transmitted signal from the sensor unit is certainly receivable by turning on the vehicle ignition switch, thereby canceling the deviation between the transmission interval and the reception interval.

BRIEF DESCRIPTION OF THE DRAWINGS

Other objects and features of the present invention will become more readily apparent from the following detailed description of the preferred embodiments taken in conjunction with the accompanying drawings in which:

FIG. 6 is an illustration of reception intervals corresponding to a transmission interval pattern to be stored in the air pressure monitor ECU for each sensor unit; and FIG. 7 is an illustration useful for explaining a rule about transmission intervals of signals from sensor units according to a second embodiment of the present invention.

DESCRIPTION OF THE PREFERRED EMBODIMENTS (First Embodiment)

A first embodiment of the present invention will be described hereinbelow with reference to the drawings. Although this embodiment relates to an example of a tire air pressure monitoring system for use in a four-wheeled passenger vehicle, the tire air pressure monitoring system according to the present invention is also applicable to trucks, buses and others.

Figure 1:
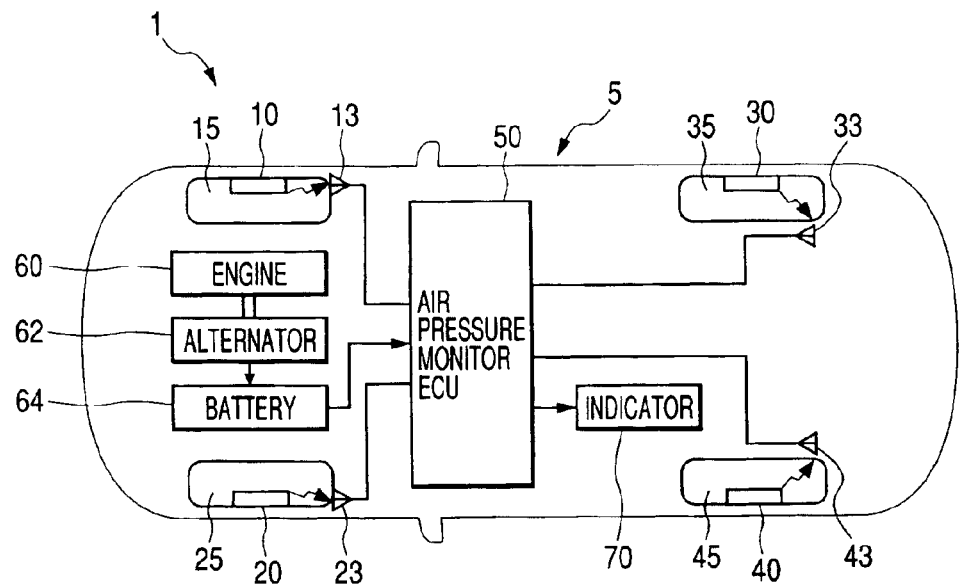
FIG. 1 schematically shows a configuration of a tire air pressure monitoring system according to a first embodiment of the present invention.
Figure 2:
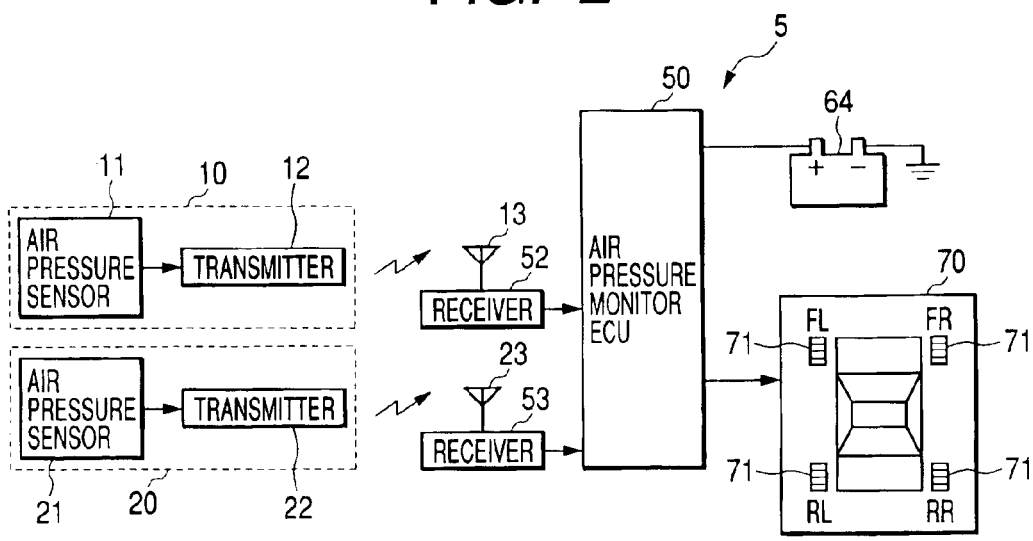
FIG. 2 is a block diagram showing functions of the tire air pressure monitoring system according to the first embodiment.

FIG. 1 is a schematic illustration of a configuration of a tire air pressure monitoring system according to this embodiment, and FIG. 2 is a block diagram showing functions of the tire air pressure monitoring system.

As shown in FIGS. 1 and 2, in the tire air pressure monitoring system, generally designated at reference numeral 1, sensor units 10, 20, 30 and 40 each composed of an air pressure sensor 11, 21, 31 or 41 for measuring tire air pressures and a transmitter 12, 22, 32 or 42 for transmitting a signal including the measured air pressure and a peculiar ID code through the use of radio wave are mounted on front-right, front-left, rear-right and rear-left tires 15, 25, 35 and 45 of the vehicle, respectively. For example, the sensor units 10, 20, 30 and 40 are constructed integrally with tire valves and are mounted on tire disc wheels, respectively. Each of the sensor units 10, 20, 30 and 40 can include a temperature sensor in addition to the air pressure sensor. This enables a decision on the air pressure state to be made taking into consideration the fluctuation of the tire air pressure stemming from temperature variation.

Receiving antennas 13, 23, 33 and 43 are placed in wheel houses of the vehicle for receiving transmitted signals from the transmitters 12, 22, 32 and 42, respectively. The signals received by the receiving antennas 13, 23, 33 and 43 are fed to receivers 52 and 53 to undergo the processing such as amplification and demodulation. Following this, each of the received signals is fed to an air pressure monitor ECU 50 to make a decision on an air pressure state of each of the tires 15, 25, 35 and 45 on the basis of an air pressure measurement value included in the received signal. Incidentally, in FIG. 1, the receivers 52, 53 are omitted from the illustration for simplicity only.

It is also appropriate that the receiving antennas 13, 23, 33 and 43 and the receivers 52 and 53 are made as a common receiving antenna and a common receiver for receiving the transmitted signals from the sensor units 10, 20, 30 and 40 without being individually provided with respect to the sensor units 10, 20, 30 and 40.

In the air pressure monitor ECU 50, the decision results on the air pressure states of the tires 15, 25, 35 and 45 are put on an indicator (display) 70 set on an instrumental panel in the interior of the vehicle. This indicator 70 has indicating portions 71, formed using LEDs or the like, corresponding to the mounted positions of the tires 15, 25, 35 and 45, as shown in FIG. 2. If the air pressure monitor ECU 50 makes a decision that the tire air pressure falls below a predetermined pressure, the indicating portion 71 corresponding to the tire having the lowered air pressure is lighted up to informing the driver of the lowering of the tire air pressure.

In this connection, the indicator 70 does not always have as many indicating portions 71 as there are the mounted positions of the tires 15, 25, 35 and 45, and it is also acceptable that, for example, only one warning lamp is provided and, when the air pressure of at least one tire lowers, is lighted to indicate the lowering of the tire air pressure. Moreover, as the indicator 70, a display is employable which is capable of directly indicating the measured air pressures of the tires 15, 25, 35 and 45.

In addition, the vehicle carries an engine 60 serving as a vehicle driving apparatus, an alternator 62 for generating electrical energy in a manner such that its rotor is rotationally driven by the engine 60, and a battery 64 charged by the alternator 62. The tire air pressure monitoring system 1 according to this embodiment operates by using the battery 64 as a power supply source.

Figure 3:
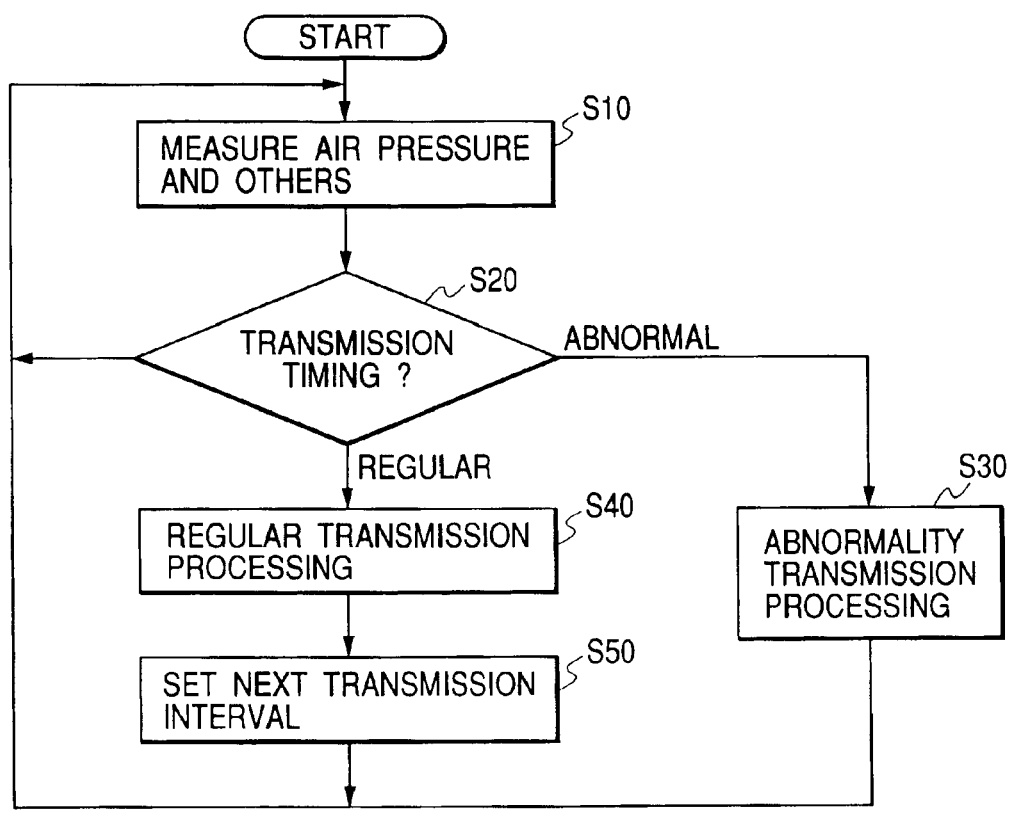
FIG. 3 is a flow chart showing the contents of control to be implemented in a sensor unit of the tire air pressure monitoring system according to the first embodiment.
Figure 4:
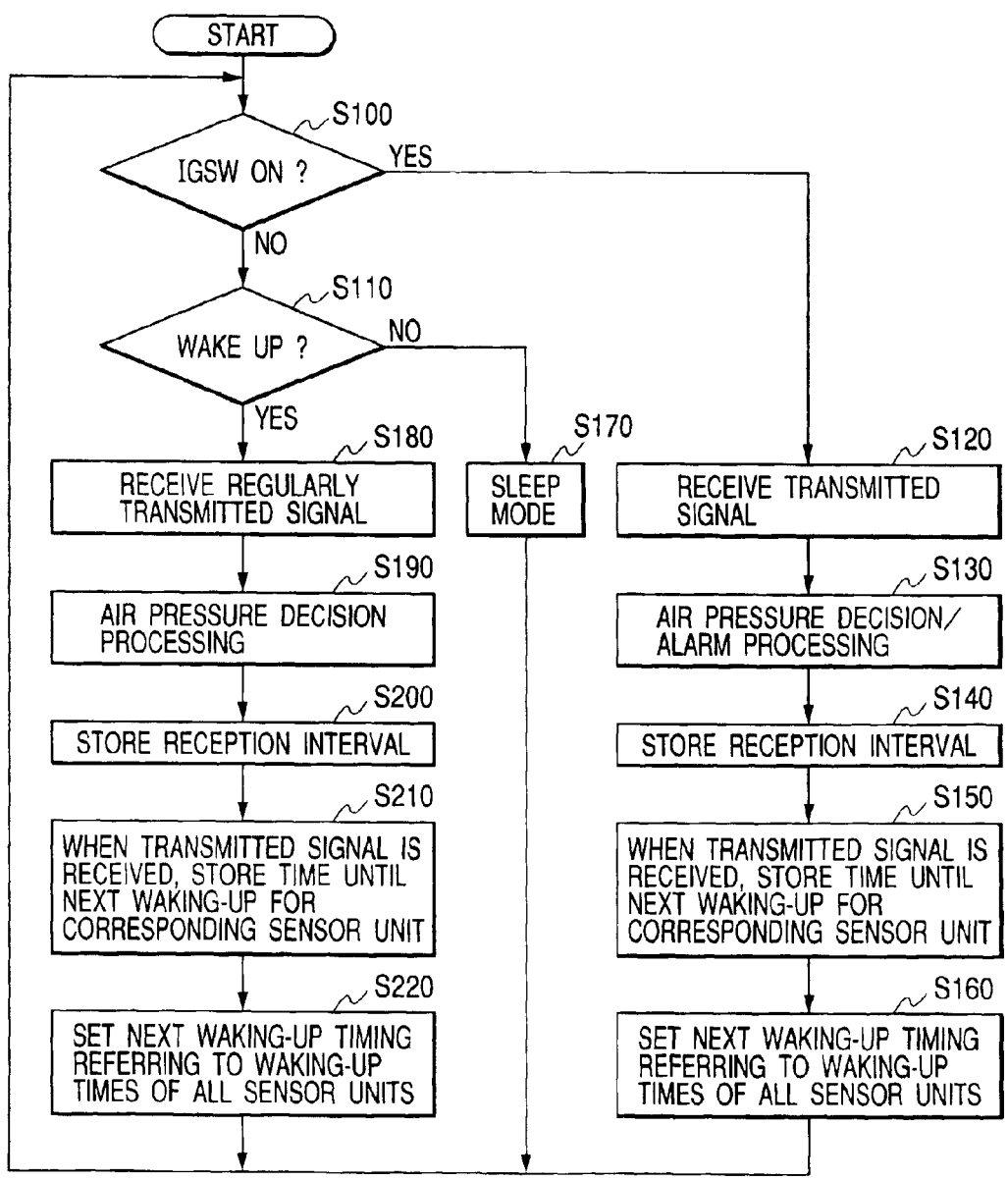
FIG. 4 is a flow chart showing the contents of control to be implemented in an air pressure monitor ECU of the tire air pressure monitoring system according to the first embodiment.

Secondly, a flow of arithmetic operations to be implemented in the tire air pressure monitoring system 1 thus constructed will be described hereinbelow with reference to flow charts of FIGS. 3 and 4, a time chart of FIG. 5 and a table of FIG. 6. FIG. 3 is a flow chart showing the processing to be executed in the sensor units 10, 20, 30 and 40, and FIG. 4 is a flow chart showing the processing to be executed in the air pressure monitor ECU 50 constituting a principal part of the monitoring unit 5. The operations to be conducted in the sensor units 10, 20, 30 and 40 are the same, and the description will be given of only the operation in the sensor unit 10.

First of all, as FIG. 3 shows, a step S10 is implemented so that the air pressure sensor 11 of the sensor unit 10 measures an air pressure. In a case in which the sensor unit 10 is equipped with a temperature sensor, the temperature sensor measures a temperature in the interior of the tire. These measurement values including the air pressure are inputted to the transmitter 12.

Following this, in a step S20, in the transmitter 12, a decision is made as to a timing at which transmitted is a transmission signal including at least the air pressure measurement value and the peculiar ID code allocated to the sensor unit 10. This decision on the transmission timing is made as follows.

First, the transmitter 12 makes a decision indicative of the transmission timing when the inputted air pressure measurement value becomes out of a range regarded as the normal or is expected to become out of the range. That is, by comparing the inputted air pressure measurement value with a predetermined normal range or by comparing a rate of change of air pressure with a predetermined value, the transmitter 12 makes a decision as to whether the air pressure measurement value is normal or abnormal. If the decision indicates that the air pressure measurement value is abnormal, a step S30 is implemented to make the transmission of a signal including the air pressure measurement value and the ID code through abnormality transmission processing to immediately transmit that air pressure measurement value to the monitoring unit 5.

Secondly, the transmitter 12 is for regularly transmitting a signal at predetermined transmission intervals, and when each of the predetermined transmission intervals elapses, a decision is made that a transmission timing comes. Moreover, in a case in which the transmission timing decision is made for the regular transmission, a step S40 is implemented to transmit a signal including an air pressure measurement value, an interval (time length) until the next transmission timing and an ID code through the regular transmission processing. Referring to a time chart of FIG. 5A, a detailed description will be given hereinbelow of this regular transmission processing.

Figures 5A, 5B:
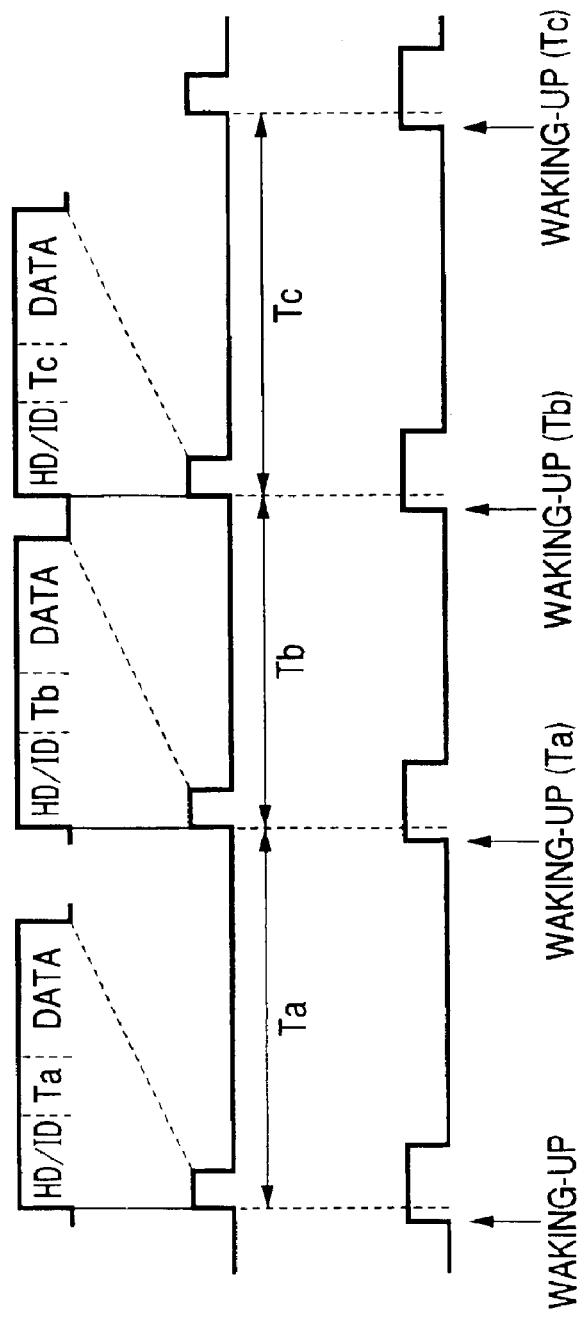
FIG. 5A is an illustration of a transmitted signal from the sensor unit.
FIG. 5B is an illustration of a state that a monitoring unit of the tire air pressure monitoring system enters a waking-up condition when an ignition switch falls into an off-condition.

As FIG. 5A shows, the transmitter 12 of the sensor unit 10 transmits a signal regularly. This transmission signal comprises a header (HD) serving as leading information, a peculiar ID code (ID) allocated to the sensor unit 10, transmission intervals (Ta, Tb, Tc . . . ) until the next signal transmission and measurement values (DATA) including an air pressure and others. The transmission intervals Ta, Tb, Tc until the next signal transmission are set to have a different time length in each case (the transmission interval varies in each case). Moreover, the transmission intervals are set to constitute a repeated transmission interval pattern comprising n different transmission intervals for each of the sensor units 10, 20, 30 and 40 as shown in a table of FIG. 6. When the transmission intervals are set in this way, it is possible to prevent the occurrence of the interference among the transmitted signals from the sensor units 10, 20, 30 and 40 due to the signal transmission therefrom at the same timing. In the table of FIG. 6, the ends of the ID codes allocated to the sensor units 10, 20, 30 and 40 are provisionally taken as 1, 2, 3 and 4, respectively.

The transmission intervals Ta, Tb and Tc forming information on the time lengths until the next signal transmission timing are included in a transmitted signal from the sensor unit 10, and the air pressure monitor ECU 50 constituting a principal part of the monitoring unit 5 extracts the transmission intervals Ta, Tb and Tc from the received signal to acquire the next signal transmission timing.

For putting each of the transmission intervals Ta, Tb and Tc, which have a different time length according to the transmission interval pattern in each case, in a transmission signal, after the completion of the regular transmission processing in the step S40 in FIG. 3, a step S50 is implemented to set the transmission intervals Ta, Tb and Tc, to be included in the next transmission signal, according to the transmission interval pattern. The transmission intervals Ta, Tb and Tc set in this step S50 are transmitted together with an ID code and an air pressure value at the next regular transmission processing in the step S40.

Furthermore, with reference to a flow chart of FIG. 4, a description will be given hereinbelow of the processing to be implemented in the air pressure monitor ECU 50.

First of all, in a step S100, a decision is made as to whether the ignition switch (IGSW) of the vehicle is in an on condition or in an off condition. If the IGSW is in the on condition, the alternator 62 is driven by the engine 60 of the vehicle to generate electricity. Accordingly, in this case, the vehicle battery 64 is charged by the alternator 62 and, hence, the monitoring unit 5 comprising the receivers 52, 53, the air pressure monitor ECU 50, the indicator 70 and others should securely receive transmitted signals from the sensor units 10, 20, 30 and 40 without taking the reduction of the electric power dissipation into consideration. For this reason, when the decision of the step S100 indicates that the IGSW is placed into the on condition, the operational flow advances to a step S120 to receive the transmitted signals from the sensor units 10, 20, 30 and 40 at all times. That is, in this case, the power supply is always made with respect to the receivers 52 and 53 to, if there exists a transmitted signal from each of the sensor units 10, 20, 30 and 40, certainly receive the transmitted signal.

In the case of the reception of a transmitted signal from any one of the sensor units 10, 20, 30 and 40, in a step S130, a decision operation is conducted with respect to an air pressure of each of the tires 15, 25, 35 and 45 and an alarm operation is conducted if the air pressure indicates an abnormal value. In this air pressure decision and alarm operation, the air pressure monitor ECU 50 first collates an ID code included in the received signal with an ID code registered therein to make a decision as to whether a predetermined relationship is satisfied between these ID codes, or example, whether or not both agree with each other. If this decision indicates that the transmitted signal is from the sensor units 10, 20, 30 and 40 of the tires 15, 25, 35 and 45 mounted on his/her own vehicle, a decision is made as to whether or not a measurement value such as an air pressure included in the transmitted signal is a proper value. Owing to the allocation of the ID codes to the sensor units 10, 20, 30 and 40 in this way, it is possible to prevent the tire air pressure decision from being made in error on the basis of a signal from another vehicle or the like, thereby improving the reliability of the tire air pressure monitoring processing.

In addition, the ID codes allocated to the sensor units 10, 20, 30 and 40 are registered in the air pressure monitor ECU 50 in a state related to the mounted positions of the tires which carry the sensor units 10, 20, 30 and 40, respectively. Therefore, in a case in which an abnormal decision is made which indicates that, for example, an air pressure measurement value included in the signal the air pressure monitor ECU 50 receives falls below a predetermined pressure, the mounted position of the tire having the abnormal air pressure can be specified on the basis of the ID code to light the indicating portion 71 corresponding to the tire mounted position, thereby enabling the driver to immediately seize the information on which of the tires of the vehicle has the air pressure lower than the predetermined pressure.

The processing of steps S140 to S160 subsequent to the step S130 are for obtaining the next timings of the signal transmission from the sensor units 10, 20, 30 and 40 to set the switching timings from the sleep mode to the waking-up mode on the basis of the next transmission timings. When the IGSW falls into the off condition, the monitoring unit 5 according to this embodiment wakes up in synchronism with the timings of the signal transmission from the sensor units 10, 20, 30 and 40 for the purpose of the reduction of electric power dissipation. In other words, except for the waking-up period, the monitoring unit 5 halts the power supply to the receivers 52, 53 and others and is set in the sleep mode to limit the functions of the air pressure monitor ECU 50. Moreover, in order to wake up the monitoring unit 5 to the transmission timings irrespective of the time at which the IGSW is turned off to set the monitoring unit 5 in the sleep mode, the waking-up timings are set while the IGSW is in the on condition.

In the step S140, the interval between the timing of the last reception of the transmitted signal from each of the sensor units 10, 20, 30 and 40 and the timing of the current reception of the transmitted signal from the same sensor unit is stored in the table shown in FIG. 6. The reason for storing the reception intervals is as follows.

In this embodiment, the transmission intervals Ta, Tb and Tc until the next signal transmission timings are included in the transmitted signals from each of the sensor units 10, 20, 30 and 40 as shown in FIG. 5A. Therefore, if at least the transmission intervals Ta, Tb and Tc included therein are stored, then the next signal transmission timings are attainable.

However, in a case in which a difference or deviation exists between a time measured by a timer measuring means such as a timer built in each of the sensor units 10, 20, 30 and 40 and a time measured by a timer measuring means such as a timer built in the air pressure monitor ECU 50, even if the air pressure monitor ECU 50 accurately measures time on the basis of the transmission intervals Ta, Tb and Tc, there is a possibility that difficulty is encountered in receiving the transmitted signals therefrom. For this reason, in this embodiment, the intervals of the actual reception of the transmitted signals from each of the sensor units 10, 20, 30 and 40 are stored in a table shown in FIG. 6. Moreover, the waking-up timings are set on the basis of these reception intervals stored in the table. This enables the waking-up timings to be set in accurate synchronism with the transmission timings even if there is a difference between the measured time in each of the sensor units 10, 20, 30 and 40 and the measured time in the air pressure monitor ECU 50.

In addition, if the air pressure monitor ECU 50 stores the reception intervals corresponding to a transmission interval pattern of each of the sensor units 10, 20, 30 and 40, at the waking-up in the case of the IGSW being placed into the off condition, even if, for example, due to noise from the external, difficulty is experienced in receiving the transmitted signals from the sensor units 10, 20, 30 and 40, the next signal transmission timings are obtainable from the stored reception intervals and, hence, the subsequent reception can be accomplished without intermission.

However, the reception interval are not always required to be stored in the table shown in FIG. 6, and it is also appropriate that the waking-up timings are set on the basis of the transmission intervals Ta, Tb and Tc included in the transmitted signals from each of the sensor units 10, 20, 30 and 40. In particular, in a case in which each of the sensor units 10, 20, 30 and 40 is not made to repeatedly perform a transmission interval pattern comprising a plurality of transmission intervals, but if the transmission interval in each case is changed irregularly through the use of, for example, random number or the like, the only possible manner is that the waking-up timings are determined on the basis of the transmission intervals included in the transmitted signals. In this case, if the time difference(s) between the transmission intervals included in the transmitted signals from the sensor units 10, 20, 30 and 40 and the reception intervals in the monitoring unit 5 is calculated to correct the transmission intervals on the basis of the time difference for setting the reception intervals, that is, for setting the waking-up timings, then it is possible to cancel the difference in measured time between the sensor units 10, 20, 30 and 40 and the monitoring unit 5.

Thereafter, the step S150 is implemented to, when the transmitted signal is received, store a time length (interval) until the next waking-up timing with respect to the corresponding sensor unit 10, 20, 30 or 40. If the relevant reception interval is stored in the table of FIG. 6, the time length until the waking-up timing is set on the basis of this reception interval and stored. On the other hand, if the relevant reception interval is not stored yet, the time length until the waking-up timing is set on the basis of the transmission intervals Ta, Tb and Tc included in the transmitted signals from the sensor units 10, 20, 30 and 40, and is stored therein.

In this case, preferably, the waking-up timings are set slightly earlier than the signal transmission timings as shown in FIGS. 5A and 5B. This enables the monitoring unit 5 to be securely placed into a receiving condition before the signal transmission even if there is a difference in measured time between the sensor units 10, 20, 30 and 40 and the monitoring unit 5 or if the waking-up of the monitoring unit 5 involves a little time. Therefore, the waking-up timing is set at a value obtained by subtracting a predetermined time from the reception interval or the transmission interval, and is stored.

In the step S160, of the time lengths until the waking-up timings with respect to all the sensor units 10, 20, 30 and 40, the time length which elapses earliest is specified and the time at which the time length elapses is set as the next waking-up timing.

If the answer of the step S100 shows that the IGSW is in the off condition, the operational flow proceeds to a step S110 to make a decision as to whether the monitoring unit 5 reaches the waking-up timing or it is in a state of maintaining the waking-up condition within a period of time (for example, 20 ms) needed for the transmitted signal reception and the air pressure decision processing after the waked-up.

If the answer of the step S110 is negative, that is, if the decision indicates that it does not reach the waking-up time, the monitoring unit 5 is placed into the sleep mode in a step S170. This sleep mode halts the supply of electric power to the receivers 52 and 53 of the monitoring unit 5 and the indicator 70 and restricts the functions of the air pressure monitor ECU 50, thereby lowering the power consumption.

On the other hand, if the decision of the step S110 indicates "Yes", the operational flow advances to a step S180 to receive signals regularly transmitted from the sensor units 10, 20, 30 and 40. Upon receipt of the transmitted signals, the air pressure decision processing is conducted in a step S190. If this decision processing indicates the abnormality of air pressure, the decision result is stored in a memory or the like, and the information to the effect that the tire air pressure is abnormal is given when the IGSW is next switched on to start the use of the vehicle.

Subsequently, in steps S200 to S220, the next timings of signal transmission from the sensor units 10, 20, 30 and 40 are obtained to set the timings of waking-up breaking the sleep mode on the basis of the transmission timings. These processing are similar to those in the above-mentioned steps S140 to S160, and the description thereof will be omitted for brevity.

As described above, in the tire air pressure monitoring system 1 according to this embodiment, the next signal transmission timings are acquired from the transmission intervals Ta, Tb and Tc included in the transmitted signals from the sensor units and the monitoring unit 5 is waked up in synchronism with the transmission timings for the reception of the transmitted signals. This can efficiently accomplish the waking-up of the monitoring unit 5, i.e., the setting in a receivable condition, thereby preventing the useless power consumption in the monitoring unit 5, which leads to the reduction of the power dissipation.

In addition, in the tire air pressure monitoring system 1 according to this embodiment, because the vehicle battery 64 is charged when the vehicle engine 60 is driven in response to the turning-on of the IGSW and an increase of the current dissipation to some degree creates no problem, the monitoring unit 5 is always set so that the transmitted signals from the sensor units 10, 20, 30 and 40 are receivable. Even if a difference exists between the timings of signal transmission from the sensor units 10, 20, 30 and 40 and the reception timings in the monitoring unit 5 when the IGSW is in the off condition and a transmitted signal unreceivable state occurs continuously, this arrangement enables certain reception of the transmitted signals from the sensor units 10, 20, 30 and 40 when the IGSW is placed into the on condition, thus canceling the deviation between the transmission interval and the reception interval.

(Second Embodiment)

Furthermore, referring to FIG. 7, a description will be given hereinbelow of a tire air pressure monitoring system according to a second embodiment of the present invention. In this embodiment, the tire air pressure monitoring system has a configuration similar to that of the above-described tire air pressure monitoring system according to the first embodiment, and the description of the configuration thereof will be omitted for simplicity.

A feature of this embodiment is that a transmitted signal from each of the sensor units 10, 20, 30 and 40 does not include information on transmission intervals Ta, Tb and Tc until the next signals are to be transmitted, and each of the sensor units 10, 20, 30 and 40 is made to transmit a signal at intervals according to a rule determined in advance while the monitoring unit 5 stores the rule on the transmission intervals in advance to set waking-up timings on the basis of the stored rule on the transmission intervals. A detailed description thereof will be given hereinbelow.

In this embodiment, the rule on the transmission intervals of signals from each of the sensor units 10, 20, 30 and 40 is determined by utilizing the number of the end (last number) of the ID code allocated to each of the sensor units 10, 20, 30 and 40. That is, as shown in FIG. 7, the average of the intervals of signal transmission from the sensor units 10, 20, 30 and 40 is set at 15 minutes and each of the transmission intervals is set as a time length obtained by adding 10 to the units digit of integral multiple of the end number of the ID code. For example, in a case in which the end number of the ID code is 8, the first transmission interval is set to be 10+8=18 (minutes), the second transmission interval is set as 10+(8×2−10)=14 (minutes), and the third transmission interval is set as 10+(8×3−20)=14 (minutes). Other transmission intervals are set in like manner.

In this connection, in a case in which the end of the ID code is 0 or 5, the transmission intervals are set as follows. That is, for setting the average transmission interval at 15 minutes, in the case of the end number being 0, the first transmission interval is set to be 20 minutes, while in the case of 5, the third transmission interval is set as 10 minutes.

When the transmission intervals for the sensor units 10, 20, 30 and 40 are set according to the above-mentioned rule, the transmission interval of each of the sensor units 10, 20, 30 and 40 varies irregularly, and different transmission intervals are set among the sensor units 10, 20, 30 and 40. Thus, it is possible to avoid, to the utmost, that signals are transmitted from the plurality of sensor units 10, 20, 30 and 40 at the same timing.

However, even in a case in which the radio interference occurs among the plurality of transmitted signals or if the monitoring unit 5 cannot receive the transmitted signals from the sensor units 10, 20, 30 and 40 due to noise signals from the external, or the like, the monitoring unit 5 according to this embodiment can acquire the next signal transmission timings because the rule about the transmission intervals of the sensor units 10, 20, 30 and 40 shown in FIG. 7 is stored therein. Therefore, it is possible to increase the probability of the reception of the transmitted signals from the sensor units 10, 20, 30 and 40 in a manner such that the monitoring unit 5 is intermittently placed into the waking-up condition when the IGSW is in the off condition.

In this connection, in a case in which the rule on the transmission intervals of transmission signals from the sensor units 10, 20, 30 and 40 is determined by utilizing the end numbers (numerals) of ID codes, it is required that the sensor units 10, 20, 30 and 40 having different ID code end numbers be mounted on tires of one vehicle.

In addition, the above-mentioned method utilizing the end numbers of the ID codes is only one example, and every rule about the transmission intervals is also acceptable provided that the sensor unit side and the monitoring unit side store the same rule.

Still additionally, although in the above-described embodiments the monitoring unit 5 is made to receive the transmitted signals from the sensor units 10, 20, 30 and 40 mounted on four tires of a vehicle, it is also possible that the monitoring unit 5 is made to receive a transmitted signal from a sensor unit mounted on a spare tire.

Yet additionally, although there would be a case in which, for example, nitrogen, other than air, is put in tires, the tire air pressure monitoring system according to the present invention is also applicable to this case for measuring the pressures in the interiors of the tires.

It should be understood that the present invention is not limited to the above-described embodiments, and that it is intended to cover all changes and modifications of the embodiment of the invention herein which do not constitute departures from the spirit and scope of the invention.

What is claimed is:

1. A tire air pressure monitoring system comprising:
  a sensor unit mounted on a tire of a vehicle for measuring an air pressure of said tire and for transmitting a signal including an air pressure measurement value intermittently; and
  a monitoring unit mounted on a body of said vehicle for receiving the transmitted signal from said sensor unit to monitor an air pressure state of said tire on the basis of said air pressure measurement value included in the transmitted signal, said monitoring unit includes:
    timing acquiring means for acquiring a transmission timing at which a signal is transmitted from said sensor unit; and
    mode switching means for, in synchronism with said signal transmission timing acquired by said timing acquiring means, setting said monitoring unit in a monitoring processing mode to receive the transmitted signal and monitor said tire air pressure state and for setting said monitoring unit in a sleep mode to rest its monitoring processing function for a period of time from when monitoring processing in said monitoring processing mode reaches completion until the next signal transmission timing.

2. The system according to claim 1, wherein said sensor unit is made to transmit a signal including, in addition to said air pressure measurement value, information on the next signal transmission timing, and said timing acquiring means acquires a timing of transmission of a signal from said sensor unit on the basis of the information on the next signal transmission timing.

3. The system according to claim 2, wherein said sensor unit is mounted on each of tires of said vehicle and each of said sensor units is made to determine the next signal transmission timing to make different signal transmission intervals at random.

4. The system according to claim 3, wherein the different signal transmission intervals of each of said sensor units are set to make a repeated transmission interval pattern comprising a plurality of transmission intervals which have different time lengths at random, and said timing acquiring means includes storage means for storing said plurality of transmission intervals constituting said transmission interval pattern for each of said sensor units.

5. The system according to claim 4, wherein said plurality of transmission intervals to be stored in said storage means correspond to reception intervals at which said monitoring unit receives the transmitted signals from said sensor units.

6. The system according to claim 1, wherein said sensor unit is mounted on each of tires of said vehicle, and intervals at which said sensor units transmit signals are set to differ from each other among said sensor units, and said timing acquiring means stores said intervals of the signal transmission from each of said sensor units to acquire a timing of the signal transmission from each of said sensor units on the basis of the stored transmission intervals.

7. The system according to claim 6, wherein the signal transmission intervals of each of said sensor units are set to have different time lengths at random to make a repeated transmission interval pattern comprising a plurality of transmission intervals.

8. The system according to claim 1, wherein said mode switching means sets said monitoring unit in said sleep mode only when an ignition switch of said vehicle is in an off condition.

* * * * *